United States Patent
Ramakrishna et al.

(10) Patent No.: US 9,473,433 B2
(45) Date of Patent: Oct. 18, 2016

(54) DEVICES AND METHODS FOR SELECTIVE ENABLEMENT OF DATA COMMUNICATION

(71) Applicant: Google Technology Holdings LLC, Mountain View, CA (US)

(72) Inventors: Abhilash Ramakrishna, Bangalore (IN); Basavaraj V. Sampaganva, Belgaum (IN)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/663,613

(22) Filed: Mar. 20, 2015

(65) Prior Publication Data

US 2015/0271115 A1    Sep. 24, 2015

(51) Int. Cl.
| | | |
|---|---|---|
| *H04W 4/12* | (2009.01) | |
| *H04L 12/58* | (2006.01) | |
| *H04W 4/00* | (2009.01) | |
| *H04W 4/14* | (2009.01) | |

(52) U.S. Cl.
CPC ............ *H04L 51/046* (2013.01); *H04W 4/001* (2013.01); *H04W 4/12* (2013.01); *H04W 4/14* (2013.01)

(58) Field of Classification Search
CPC ....................................................... H04L 12/58
USPC ........................................................ 455/466
See application file for complete search history.

(56) References Cited

U.S. PATENT DOCUMENTS

| | | | | |
|---|---|---|---|---|
| 8,411,600 | B2* | 4/2013 | Jou | H04L 1/1692 370/278 |
| 2008/0005325 | A1* | 1/2008 | Wynn | G06Q 10/107 709/225 |
| 2010/0087184 | A1* | 4/2010 | Stoev | G06F 8/65 455/422.1 |

FOREIGN PATENT DOCUMENTS

| | | |
|---|---|---|
| EP | 2175614 B1 | 4/2010 |
| WO | 2012005636 A1 | 1/2012 |

OTHER PUBLICATIONS

Armstrong, Trevor et al. "Efficient and Transparent Dynamic Content Updates for Mobile Clients." Mobisys 2006. The 4th International Conference on Mobile Systems, Applications and Services. Uppsala, Sweden, Jun. 19-22, 2006. 13 pages.
International Search Report and Written Opinion issued in PCT/US2015/021656, mailed May 29, 2015, 11 pages.

* cited by examiner

*Primary Examiner* — Qutbuddin Ghulamali
(74) *Attorney, Agent, or Firm* — Faegre Baker Daniels LLP (57) ABSTRACT

A communication device includes a communication circuit, one or more processors operable with the communication circuit, and one or more memory devices to store one or more applications. The one or more processors can enable data messaging communication through the communication circuit and disable other data communication through the communication circuit. A data message can be received indicating a request to enable at least data communication with at least one application to deliver a payload to the application. In response to receipt of the data message, data communication can be enabled with the application to receive the payload. After receipt of the payload, data communication with the application can again be disabled.

20 Claims, 8 Drawing Sheets

DEVICES AND METHODS FOR SELECTIVE ENABLEMENT OF DATA COMMUNICATION

CROSS-REFERENCE TO RELATED APPLICATION

This application claims the benefit of India Application No. IN 836/DEL/2014, filed Mar. 22, 2014, entitled "DEVICES AND METHODS FOR SELECTIVE ENABLEMENT OF DATA COMMUNICATION," which is herein incorporated by reference in its entirety for all purposes.

BACKGROUND

1. Technical Field

This disclosure relates generally to electronic devices, and more particularly to electronic communication devices.

2. Background Art

Mobile electronic communication devices, such as mobile telephones, smart phones, gaming devices, and the like, are used by billions of people. The owners of such devices come from all walks of life. These owners use mobile communication devices for many different purposes including, but not limited to, voice communications and data communications for text messaging, Internet browsing, commerce such as banking, and social networking. The circumstances under which users of mobile communication device use their devices varies widely as well.

In using mobile communication devices for so many different combinations of applications, service providers offer a wide variety of plans. Some include voice communications only, some offer voice communications and limited data communications, and others offer voice communications and unlimited data communications. Other plans do not include voice communications, but include one of limited data communications or unlimited data communications. The price for each plan varies.

One problem associated with many electronic communication devices is the user is unaware of how frequently the device communicates with a server for data. Illustrating by example, one device operating an electronic mail application may fetch mail continually, while another device operating a different electronic mail application may fetch mail hourly. Still another device running yet another electronic mail application may fetch mail only once a day. The amount of data communications traffic imposed on the network in each of these devices will be vastly different. Unpleasant surprises can arise for a user with a limited data plan when their device exceeds a monthly limit as the additional fees for this data communication can accumulate quickly. It would be advantageous to have a device or method that intelligently managed data communications to and from an electronic device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to enabling and disabling data communications in an electronic device in response to message communications. Any process descriptions or blocks in flow charts should be understood as representing modules, segments, or portions of code which include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of receiving message communications to enable data communications so a particular application can receive a data payload without data communications being continually enabled as described herein. The non-processor circuits may include, but are not limited to, a radio receiver, a radio transmitter, signal drivers, clock circuits, power source circuits, and user input devices. As such, these functions may be interpreted as steps of a method to perform selective enablement and disablement of data communications to reduce the data communications load on a network from a particular electronic device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure contemplate that many data communications plans suitable for use with mobile communication devices such as smart phones, tablet computers, media players, gaming devices, and so forth, can become very expensive when a user exceeds their data communication traffic allotment for a particular billing period. For example, when a user with an allocation of one gigabyte of data communications traffic per month exceeds that by, say, 500 kilobytes, the user may be in for a rude surprise when opening the monthly bill.

To avoid such situations, as well as to maintain a monthly budget, many users simply turn data communications OFF in their device, thereby preventing all data communications with a network or server. Users elect this option because it is sometimes difficult to know which applications or device components are pulling data from the network, or in what amounts the data are being pulled. Users thus turn everything OFF to ensure no overage fees are assessed.

While this solution helps to ensure that a monthly budget will not be exceeded, it is less than desirable because the user is likely to miss timely communications such as electronic mail communications, calendar invitations, breaking news, and so forth. For instance, a user may be in the midtown district of a metropolitan city at the same time as a friend. If the friend sends a calendar invite stating, "Lunch at Buster's Restaurant at noon" and the recipient's data communications connection is turned OFF in an overabundance of caution to avoid data overage charges, the user may well miss having a delightful lunch at Buster's of roasted barramundi with carrot latkes. Not only does the user miss a tasty meal, but they miss seeing their friend as well.

Embodiments of the disclosure advantageously provide a solution to this dilemma by selectively enabling data communication, and optionally selectively launching a particular application, so that data communications relating to events of interest can be received in a limited fashion without all data communications being enabled. For example, in one embodiment a message can be delivered from a server complex to an electronic communication device when a data communication payload is needs to be delivered. When this occurs, the electronic device can selectively enable data communication for an application for which the data communication payload is intended, receive the data communication payload, deliver it to the application, and then again disable data communication. This works to ensure that users do not miss important events.

Continuing the example above, when the friend sends a calendar invite stating, "Lunch at Buster's Restaurant at noon" and the recipient's data communication connection is disabled, in one embodiment a server complex sends a message to the recipient's electronic device. In response to the message, which can be a short message service (SMS) message in one embodiment, the recipient's device can enable data communication with a calendar application operating on the recipient's device. The recipient's electronic device can optionally launch the calendar application as well in one or more embodiments. The server complex then sends the calendar invite to the recipient's device. After receiving the data communication payload, the recipient's device then disables data communication capability. The user sees that a new invitation has been received. However, advantageously, the calendar application did not need to continually poll the server complex to receive the invitation. By using embodiments of the disclosure, the recipient will be able not only to see the friend, but also have a wonderful lunch at Buster's Restaurant.

In one embodiment, a communication device, which may be a smartphone, tablet computer, or other communication device, includes a communication circuit, one or more processors, and one or more memory devices. The processors can be operable with the communication circuit to send and receive voice communications, data communications, or combinations thereof to and from a network and/or server complex. The memory devices can store one or more applications suitable for operation on the processors.

In one embodiment, the processor or processors can be configured to enable data messaging communication through the communication circuit and disable other data communication through the communication circuit. When a server complex in communication with the communication device receives a data payload intended for the communication device, the server complex can transmit a data message to the communication device. In one embodiment, the data message can indicate a request to enable at least data communication with at least one application to deliver a payload to the application.

In response to receiving the message, the communication device can enable data communication with the application to receive the payload. The communication device can optionally launch the application if it is not running as well. After receipt of the payload, the processor or processors of the communication device can again disable data communication with the application, thereby mitigating the risk that the device will exceed a data communication allotment within a predetermined time period.

Figure 1:
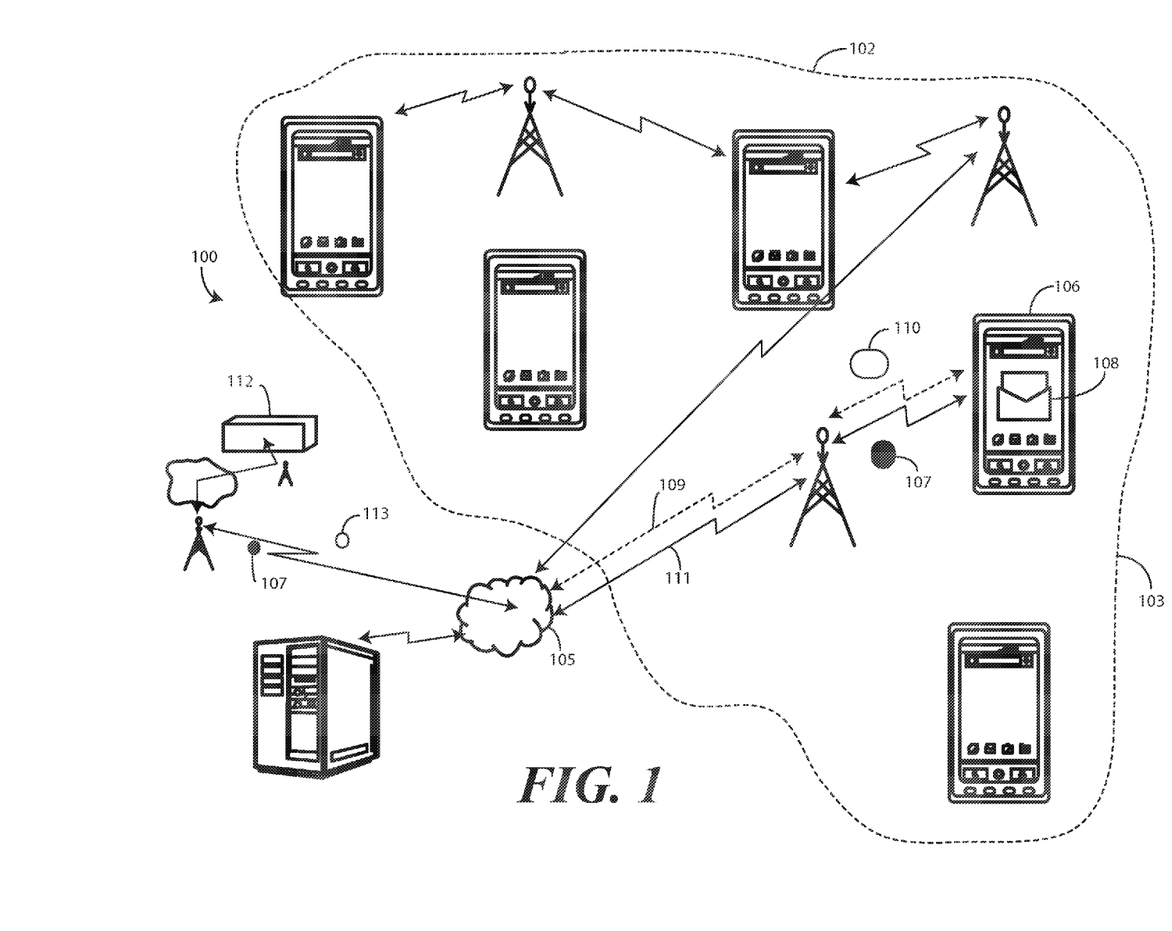
FIG. 1 illustrates one explanatory system configured in accordance with one or more embodiments of the disclosure.

Turning now to FIG. 1, illustrated therein is one system 100 configured in accordance with one or more embodiments of the disclosure. The system 100 includes a server complex 101 and a plurality of communication devices 102 operating in a distributed communication network 103. While one server complex 101 is shown, it will be obvious to those of ordinary skill in the art having the benefit of this disclosure that the server complex 101 can be one or more server complexes. The server complex 101 can be configured as hardware, software, processing logic, or combinations thereof that are designed, arranged, and/or configured to execute some of the methods and steps described herein. In one embodiment, the server complex 101 can be a single hardware system deployed at a remote location. In other embodiments, the server complex 101 can be distributed using multiple hardware components located across different physical locations. The server complex 101 can perform various processes related to selective delivery of data communications to one or more of communication devices 102.

The communication devices of the plurality of communication devices 102 can be any type of a variety of devices, including a desktop, laptop, netbook, or tablet computer, mobile communication devices, personal digital assistants, gaming devices, media players, tablet or palmtop computers, and so forth. As noted above, for ease of illustration the devices will be referred to as being mobile or portable. However, embodiments of the disclosure are not so limited.

In one embodiment, each communication device of the plurality of communication devices 102 operates in a distributed communication network 103. In one embodiment, at least some of the distributed communication network 103 is in communication 104 with the server complex 101. In one embodiment, each device of the plurality of communication devices 102 is in wireless communication with the server complex 101 across a network 105.

In one embodiment, at least some of the communication devices, e.g., communication device 106, are configured to receive data communications. The communication device 106 can be operable to receive voice communication, data communication, or combinations thereof. One or more processors of the communication device 106 can be operable to selectively enable and selectively disable one or more of the communication mechanisms. For example, one or more processors of the communication device 106 can enable data messaging communication so that the communication device 106 can receive short message service messages or multimedia message service messages. At the same time, the processor(s) of the communication device 106 can disable other communication. Consequently, data communication for applications other than short message service messages and/or multimedia message service messages will not occur when the other data communication services are not enabled. In one embodiment, the processor(s) of the communication device 106 are to disable all data communications other than messaging communications.

In one embodiment, the server complex 101 is operable to receive a data payload 107 from a third party 112. In one embodiment, the data payload 107 is intended for an application 108 operating on a communication device, e.g., communication device 106. When the server complex 101 receives this data payload 107, in one embodiment the server complex 101 is to transmit 109 a message 110 to the communication device 106. In one embodiment, the message 110 is a short message service message. In one embodiment, the message 110 indicates or identifies the application 108 for which it is intended. In one or more embodiments, the message 110 provides a request to deliver the data payload 107 to the application 108.

The communication device 106 then receives the message 110 in the form of a data message. In one embodiment, the message 110 provides a request to enable data communication 111 with at least the application 108. In response to receiving the message 110, in one embodiment the processor(s) of the communication device 106 then enable data communication 111 with the application 108 through a communication circuit. In one embodiment, the processor(s) can also launch the application 108.

The server complex 101 can then, after transmitting the message, deliver the payload to the application 108 operating on the processor(s) of the communication device 106. The processor(s) of the communication device 106 then receives the data payload and delivers it to the application 108. After receipt of the data payload, in one embodiment the processor(s) of the communication device 106 then disable the data communication 111. The processor(s) of the communication device 106 can optionally terminate the application 108 as well. In one embodiment, the server complex 101 can then cease communication with the communication device 106 until another message is sent in response to the server complex 101 receiving another data payload. As with before, the new message can indicate the application to which the data payload is directed, as well as provide another request for data communication 111 with the communication device 106.

In this manner, the communication device 106 can disable all data communication other than messaging communication. This allows a user to reduce the amount of data traffic pulled through the network 105. At the same time, the use of a message 110 to selectively enable data communication 111 with the communication device 106 ensures that a user of the communication device 106 does not miss receiving important information.

To illustrate operation of the system 100 by example, presume the user of communication device 106 has turned OFF all data communication other than short message service communication. Now presume that a friend sends the user an electronic mail message. With prior art systems, the user could not receive the message because data service is turned OFF. However, using embodiments of the present disclosure, the server complex 101 sends a message 110 to the communication device 106. In one embodiment, the message 110 identifies the application 108, which in this example would be the electronic mail application. The processor(s) of the communication device 106 then optionally launch the application 108 and enable data communication 111 with the application 108. In one embodiment, the processor(s) enable data communication 111 only with the application 108. The server complex 101 then sends the electronic mail message as a data payload 107. The electronic mail message is received through a communication circuit of the communication device 106 and delivered to the application 108. The processor(s) of the communication device 106 can then disable data communication 111 with the server complex 101 until another message 110 is received.

In one embodiment, the message 110 is a "hidden" data message. This means that it is received by the operating system in the background without being presented to the user on a display. While the application 108 may present an alert that the data payload 107 has been received as a notification prompt on the display, hidden data messages are handled without notification to the user in one or more embodiments. Instead, hidden data messages trigger data communication 111 enablement, data communication 111 disablement, optional application 108 launching and termination, and otherwise handling and coordinating receipt of the data payload 107. By contrast, normal data messages, such as standard short message service messages, would of course be presented to a user by a messaging application.

In one embodiment, the message 110 includes a representational state transfer application-programming interface. A representational state transfer application-programming interface is a data architecture with constraints applied to various components of the data structure. The constraints are placed upon interaction of components with other components, as well as their interpretation of data elements. Embodiments of the disclosure contemplate that the third party 112 sending the data payload 107 may not include an infrastructure to transmit the message 110 to enable data communication 111 with a communication device 106. Accordingly, in one embodiment, such infrastructure resides at the server complex 101 operating in communication with the plurality of communication devices 102. The infrastructure provides the representational state transfer application-programming interface. The third party 112 can then invoke the representational state transfer application-programming interface to cause the server complex 101 to transmit the message 110.

Illustrating by example, in one embodiment the third party 112 attempts to send the data payload 107 directly to a communication device 106 across the network 105. If data communication 111 with the communication device 106 is disabled, the third party 112 detects that the data payload 107 remains undelivered. Accordingly, the third party 113 sends a request to invoke the representational state transfer application-programming interface to the server complex 101. The server complex 101, in turn, then transmits the message 110 to the communication device 106 to enable data communication 111 as previously described.

In one or more embodiments, once data communication 111 is enabled by the communication device 106, a timer can be initiated. Upon expiration of the timer, which may be set for example for two minutes, a time-out condition occurs in the communication device 106. In one embodiment, the time-out condition disables data communication 111. If the third party 112 still desires to send the data payload 107, or if the data payload 107 remains undelivered, a new message 110 can be sent to the communication device 106 to again enable the data communication 111.

In one or more embodiments, a user of the communication device 106 can control which applications are operable with the system 100 and which are not. For example, a particular user may want an electronic mail application, a weather application, and a social networking application to enable data communication 111 in response to messages 110. However, they may not want a shopping application to respond the same way. Thus, in one embodiment the user is able to provide user input to the electronic device 106 to prevent one or more applications from operating in response to messages 110. Such a feature would be advantageous, for example, if the user feels a particular application is enabling data communication 111 too frequently in response to messages 110. The user may simply provide user input to disable the feature for that application.

Figure 2:
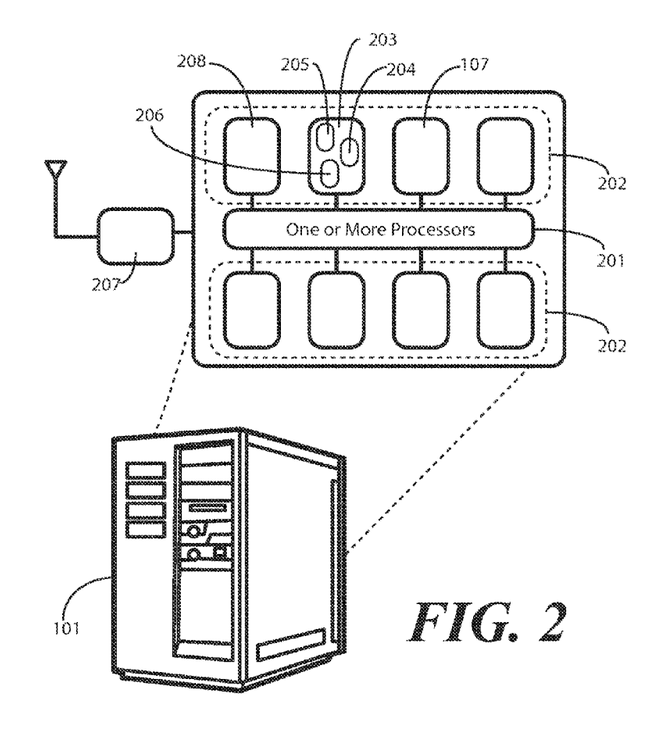
FIG. 2 illustrates one explanatory server complex in accordance with one or more embodiments of the disclosure.

Turning now to FIG. 2, illustrated therein is one embodiment of a server complex 101 suitable for use with one or more embodiments of the disclosure. As noted, the server complex 101 may include one or more processors 201. The one or more processors 201 may be operable with one or more memory devices 202. The one or more memory devices 202 can be used to store the data payloads 107 to be delivered to communication devices in communication with the server complex. The one or more memory devices 202 can also store executable instructions for the one or more processors 201 to provide operation for the server complex 101.

In one embodiment, the one or more processors 201 can generate the messages that are sent to the communication devices to enable data communication. In one embodiment, a data message 203 indicates an application for which a data payload 107 is intended by including an application identifier 204. The data message 203 can also provide a request 205 to deliver the data payload 107 to the application. The data message 203 can also include a request 206 to enable data communication with at least one application. As noted above, the data message 203 can include a representational state transfer application programming interface that a third party (112) can invoke to cause the data message 203 to be sent.

In one embodiment, the one or more processors 201 are operable to receive the data payload 107 intended for an application operating on one communication device. The one or more processors 201 can then transmit, through a communication circuit 207 a data message 203 to the communication device. After transmitting the message, the one or more processors 201 can deliver the data payload 107 to the application operating on the one communication device.

In one or more embodiments, the one or more processors 201 can then cease communication with the communication device until another message 208 indicating either the same or a different application is sent to the communication device.

Figure 3:
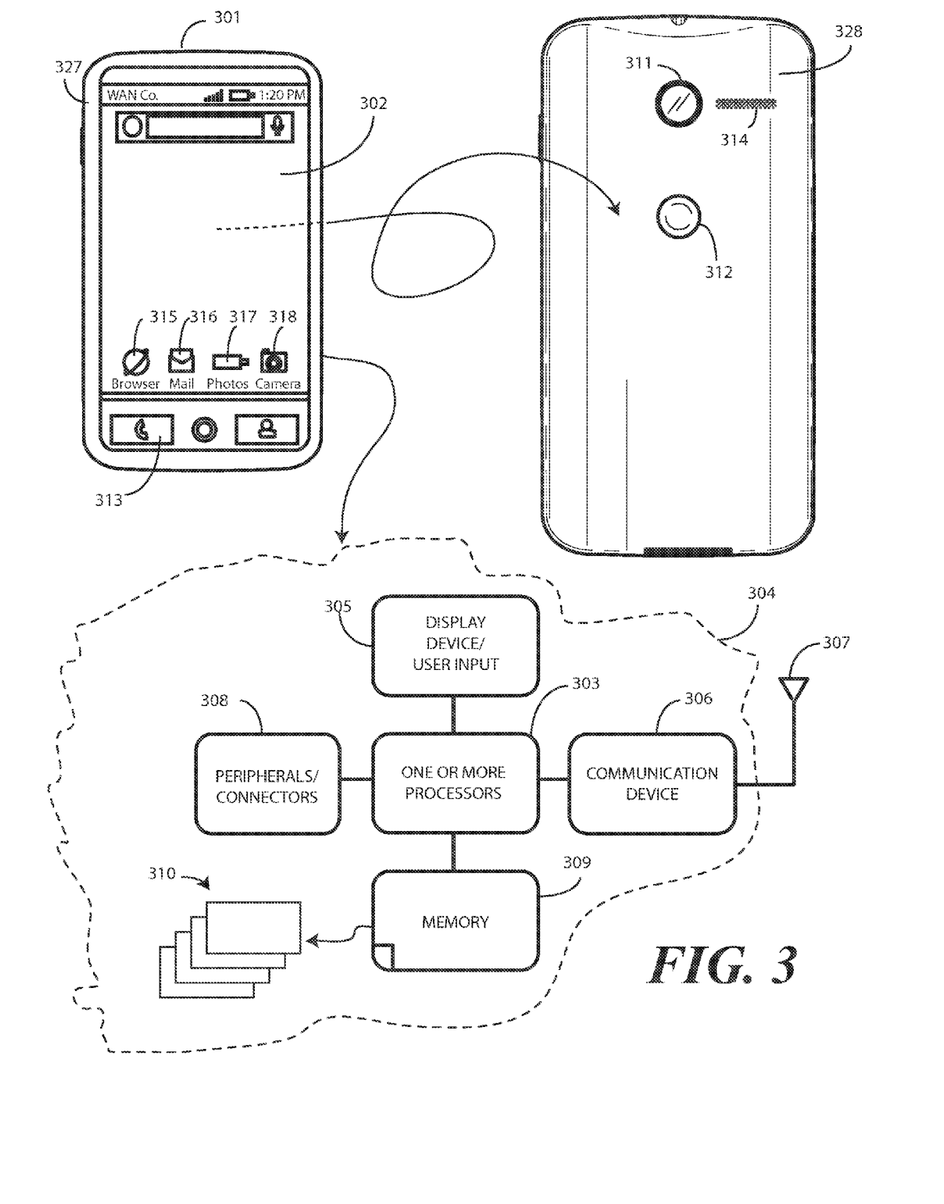
FIG. 3 illustrates one explanatory electronic device in accordance with one or more embodiments of the disclosure.

Turning now to FIG. 3, illustrated therein is one explanatory mobile communication device 300 configured in accordance with one or more embodiments of the disclosure. The explanatory mobile communication device 300 is shown as a smart phone for ease of illustration. However, it will be obvious to those of ordinary skill in the art having the benefit of this disclosure that other portable electronic devices may be substituted for the explanatory smart phone as noted above. The mobile communication device 300 may be configured as a palm-top computer, a tablet computer, a gaming device, wearable computer, a remote controller, a media player, laptop computer, portable computer, or other electronic device.

The mobile communication device 300 includes a housing 301. In FIG. 3, a front housing member 327 is disposed about the periphery of a display 302. A rear-housing member 328 forms the backside of the mobile communication device 300 in this illustrative embodiment. Features can be incorporated into the housing members 327,328. Examples of such features include an optional camera 311 or an optional speaker port 314, which are show disposed on the backside of the mobile communication device 300 in this embodiment. In this illustrative embodiment, a control button 312 is disposed along the rear-housing member 328 on the backside of the mobile communication device 300.

In one embodiment, a display 302 is disposed along the front surface of the housing 301 of the mobile communication device 300. In one embodiment, the display 302 is configured to provide visual output, images, or other visible indicia to a user. In one embodiment, the display 302 comprises an organic light emitting diode (OLED) device. In one embodiment, the display 302 comprises a touch sensor to form touch sensitive display configured to receive user input across the surface of the display 302. The display 302 can also be configured with a force sensor. Where configured with both a touch sensor and force sensor, one or more processors 303 of the mobile communication device 300, operable with the touch sensor and the force sensor, can determine not only where the user contacts the display 302, but also how much force the user employs in contacting the display 302.

In FIG. 3, the explanatory mobile communication device 300 is shown illustratively with a schematic block diagram 304. In this embodiment, the mobile communication device 300 includes a user interface 305, which can include the display 302. The illustrative mobile communication device 300 also includes a communication circuit 306 that can be configured for wired or wireless communication with one or more other devices or networks such as network (105) from FIG. 1. The networks can include a wide area network, a local area network, or personal area network as well. Examples of wide area networks include GSM, CDMA, WCDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, and other networks. The communication circuit 306 can include wireless communication circuitry, one of a receiver, a transmitter, or transceiver, and one or more antennas 307.

The mobile communication device 300 includes one or more processors 303, which can have one or more control circuits. The one or more processors 303 are responsible for performing the various functions of the device. The one or more processors 303 can be a microprocessor, a group of processing components, one or more Application Specific Integrated Circuits (ASICs), programmable logic, or other type of processing device. The one or more processors 303 can be operable with the user interface 305 and the communication circuit 306, as well as various peripheral devices, ports, or connectors 308 that can be coupled to the mobile communication device 300 via interface connections.

The one or more processors 303 can be configured to process and execute executable software code to perform the various functions of the mobile communication device 300. A storage device, such as memory 309, stores the executable software code used by the one or more processors 303 for device operation. The executable software code used by the one or more processors 303 can be configured as one or more modules 310 that are operable with the one or more processors 303. Such modules 310 can store instructions, control algorithms, and so forth. The instructions can instruct processors or one or more processors 303 to perform the various steps, touch sensing, and methods described below.

In one embodiment, the one or more processors 303 are responsible for running the operating system environment of the mobile communication device 300. The operating system environment can include a kernel, one or more drivers, and an application service layer, and an application layer. The operating system environment can be configured as executable code operating on one or more processors 303 or control circuits of the mobile communication device 300.

The application layer can be responsible for executing application service modules. The application service modules may support one or more applications or "apps." Examples of such applications shown in FIG. 3 include a cellular telephone application 313 for making voice telephone calls, a web browsing application 315 configured to allow the user to view webpages on the display 302 of the mobile communication device 300, an electronic mail application 316 configured to send and receive electronic mail, a photo application 317 configured to permit the user to view images or video on the display 302 of mobile communication device 300, and a camera application 318 configured to capture still (and optionally video) images. These applications are illustrative only, as others will be obvious to one of ordinary skill in the art having the benefit of this disclosure.

As noted above, the one or more processors 303 can be configured to one or more of launch one of the apps and/or enable data communication with one of the apps in response to receipt of messages (110). In one or more embodiments, the one or more processors 303 are responsible for managing the applications and all data communications of the mobile communication device 300. Accordingly, the one or more processors 3030 can be responsible for launching, monitoring and killing the various applications and the data communication with the various applications in response to receipt of messages, data payloads, and so forth as described above. The applications of the application layer can be configured as clients of the application service layer to communicate with services through application program interfaces (APIs), messages, events, or other inter-process communication interfaces.

Figure 4:
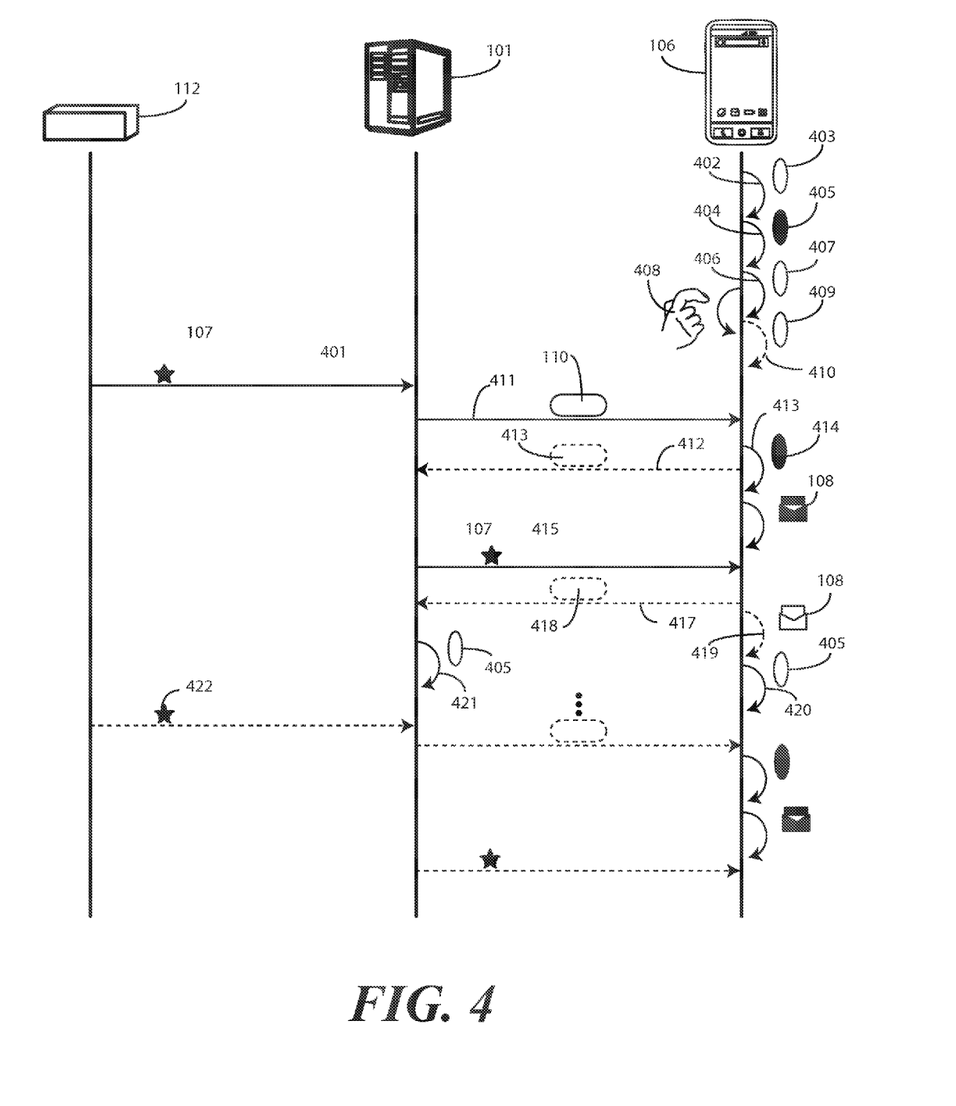
FIG. 4 illustrates one explanatory signal flow diagram illustrating explanatory method steps in accordance with one or more embodiments of the disclosure.

Turning now to FIG. 4, illustrated therein is a messaging protocol illustrating one or more methods in accordance with embodiments of the disclosure. Three entities are shown in FIG. 4, namely a third party 112, a server complex 101, and a communication device 106.

The third party 112, which may be a content provider for one or more applications operating on the communication device 106, can initially transmit 401 a data payload 107 to the server complex 101. In one embodiment, the data payload 107 is intended for a particular application operating on the communication device 106. A post to a social networking website, for example, may comprise a data payload 107 for a social networking application. Similarly, an electronic mail message may comprise a data payload 107 for an electronic mail application, and so forth.

The server complex 101 then receives the data payload 107. Prior to this occurring, in one embodiment the communication device 106 enables 402 data messaging communication 403 through its communication circuit (306). The communication device 106 can then disable 404 other data communication 405 through the communication circuit (306). In one embodiment, the communication device 106 disables all data communication other than the data messaging communication 403. Said differently, in one embodiment the communication device 106 disables 404 the communication of data with applications of the communication device other than data messaging communications. In one embodiment, the communication device 106 also enables 406 voice communication 407. Thus, the disabling of data communication excludes voice communication 407 in one or more embodiments.

In one embodiment, user input 408 can be received at the communication device 106. The user input 408, as noted above, can selectively enable 410 data communication 409 with one or more selected applications. Where this occurs, the disabling 404 of other data communication 405 would exclude data communication 409 with the selected applications.

In one embodiment, since other data communication 405 with applications is disabled, the server complex 101 is unable to deliver the data payload 107 to the communication device 106. The server complex 101 then transmits 411 a message 110 or a data message (203) to the communication device 106. The communication device 106 receives the message 110 or data message (203). In one embodiment, the message 110 or data message (203) requests data communication with an application operable on the one or more processors (303) of the communication device 106. The communication device 106 can optionally conceal the message 110 or data message (203) from the user interface of the communication device 106 by treating it as a hidden message as previously described. In one embodiment, after the receiving the message 110 or data message (203), the communication device 106 can optionally transmit 412 an acknowledgement 413 to receive the data payload 107 in the form of one or more data packets for the application.

The communication device 106 can then temporarily enable 413 data communication 414 with an application 108 identified by the message 110 or data message (203). The communication device 106 can then receive 415 the data payload 107. In one embodiment, the data payload 107 is transmitted in the form of one or more data packets from the server complex 101. Prior to receiving the data packets, the communication device 106 can optionally launch 416 the application 108 on the communication device 106. The communication device 106 can optionally transmit 417 an acknowledgement 418 to the server complex 101 indicating that all data packets have been successfully received.

After receipt of the data packets, the communication device 106 can optionally terminate 419 the application 108. In one embodiment, the communication device 106 then again disables 420 data communication 405 with the application 108. The server complex 101 can cease 421 data communication 405 with the communication device 106 until a new data payload 422 is received, where the process can repeat.

Figure 5:
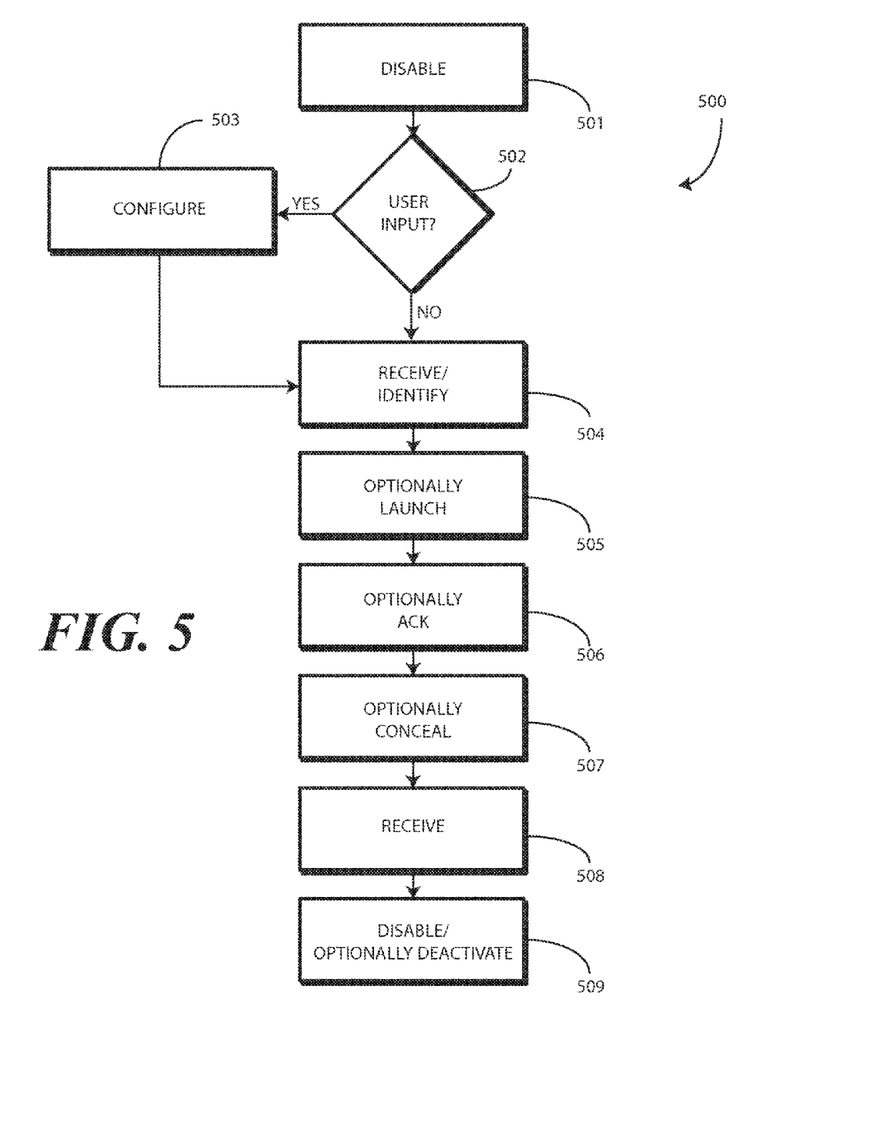
FIG. 5 illustrates one explanatory method in accordance with one or more embodiments of the disclosure.

Turning now to FIG. 5, illustrated therein is a method 600 suitable for operation on the communication device (106) to accomplish the method of FIG. 4. At step 601, the method 600 disables data communication other than data messaging communication. In one embodiment, the disabling at step 601 excludes voice communication.

At decision 602, the method 600 checks to see whether any user input to control how applications respond to the method 600 has been received. Where it has, at step 603 the method 600 can configure the communication device (106) accordingly. For example, in one embodiment the method 600 can receive user input to selectively enable one or more other applications. Where this occurs, the disabling at step 601 excludes communication with the one or more other applications selected by the user.

At step 603, the method 600 receives a data message indicating a request to enable at least data communication with at least one application to deliver a payload to the at least one application. At step 604, the method 600 can optionally launch the application indicated in the message received at step 603. At step 604, the method 600 can optionally transmit an acknowledgement to the message received at step 603. At step 605, the method 600 can optionally conceal the message received at step 603 from a user interface by treating it as a hidden message.

At step 606, in response to receipt of the data message at step 603, the method 600 can enable data communication with the application to receive the payload. At step 607, the method 600 can then disable data communication with the application. Step 607 can also include terminating the application.

Figure 6:
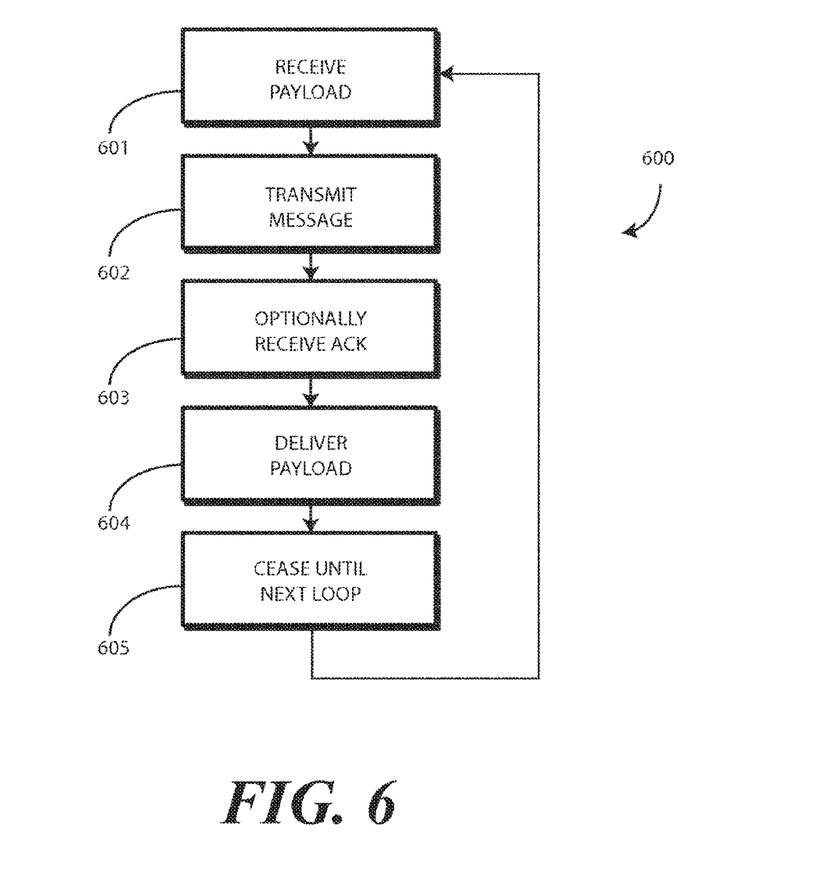
FIG. 6 illustrates one explanatory method in accordance with one or more embodiments of the disclosure.

Turning now to FIG. 6, illustrated therein is a method 700 suitable for operation on a server complex (101) to accomplish the method of FIG. 4. At step 701, the method 700 receives a data payload intended for an application operating on one communication device. At step 702, the method 700 transmits a message to the one communication device. In one embodiment, the message indicates the application and provides a request to deliver the data payload to the application. An acknowledgement may be optionally received from the one communication device at step 703.

At step 704, after transmitting the message at step 702, the method 700 delivers the data payload to the application operating on the one communication device. At step 705, the method ceases communication with the one communication device until another message indicating the application or another payload is sent to the one communication device.

Figure 7:
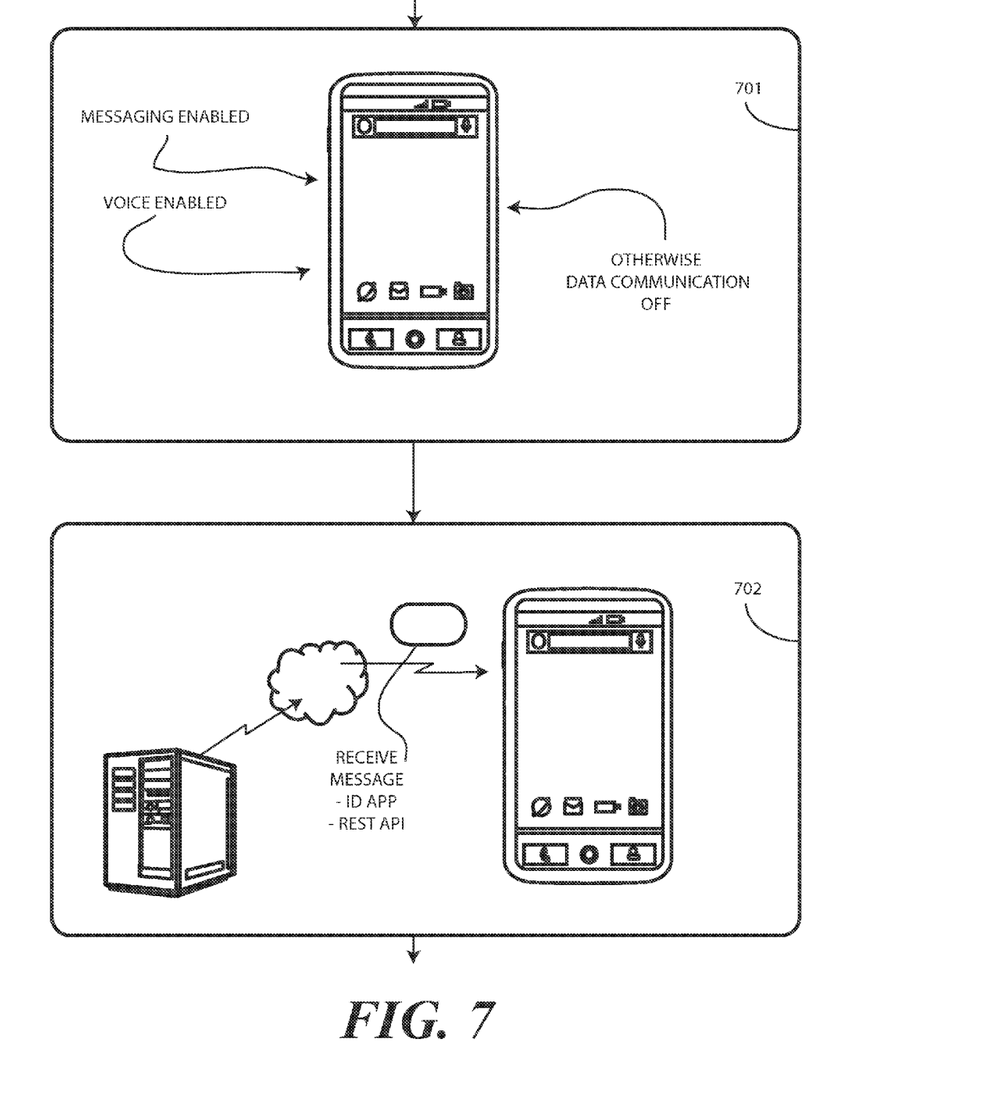
FIG. 7 illustrates explanatory method steps in accordance with one or more embodiments of the disclosure.
Figure 8:
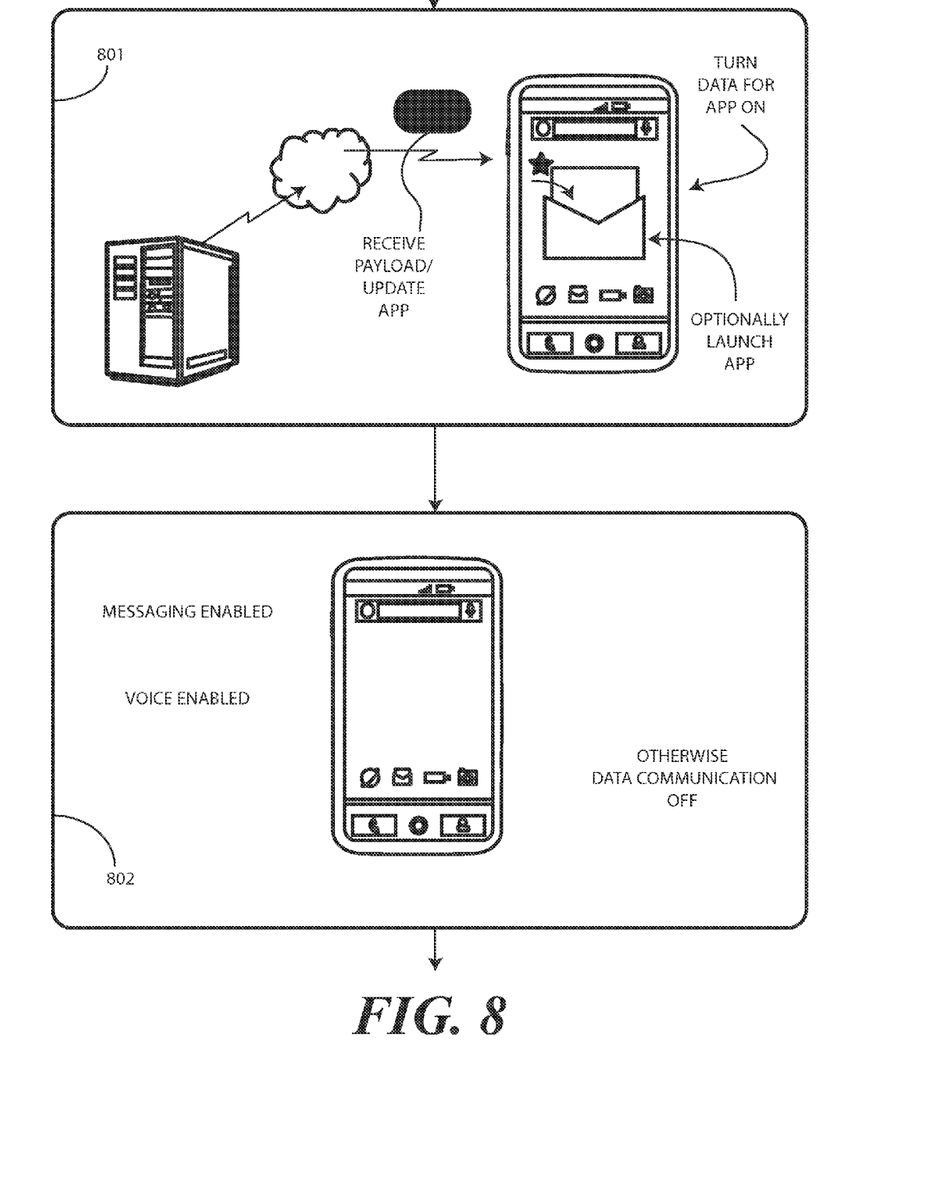
FIG. 8 illustrates additional explanatory method steps in accordance with one or more embodiments of the disclosure.

Turning now to FIGS. 7 and 8, a process in accordance with one or more embodiments of the disclosure is illustrated graphically. At 701, an electronic communication device has data messaging enabled, voice data enabled, and all other data communication disabled. At 702, a server complex transmits a message identifying an application and requesting data communication with the application. At 801, in response to the message from 702, the electronic communication device enables data with the particular application after launching the application. The server complex then delivers the payload as one or more data packets to the electronic communication device. At 802, the electronic communication device again disables data communication for the application from the server complex and returns to the state it was in at 701.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A communication device, comprising:
   a communication circuit operable to connect the communication device to a network;
   one or more processors operable with the communication circuit; and
   one or more memory devices to store one or more applications operable on the one or more processors;
   the one or more processors operable to:
   enable data messaging communication with the network through the communication circuit and disable other data communication with the network through the communication circuit;
   receive a data message indicating a request to enable at least data communication with at least one application via the network to receive an application specific message comprising a payload for the at least one application;
   in response to receipt of the data message, enable the at least data communication from the network with the at least one application to receive the application specific message comprising the payload; and
   after receipt of the application specific message comprising the payload, disable the other data communication with the network through the communication circuit.

2. The communication device of claim 1, the data message comprising a short message service message.

3. The communication device of claim 1, the data message identifying the at least one application.

4. The communication device of claim 1, the one or more processors to, in response to receipt of the data message, launch the at least one application.

5. The communication device of claim 1, the at least data communication comprising only communication for the at least one application.

6. The communication device of claim 1, the data message comprising a hidden data message.

7. The communication device of claim 1, the other data communication comprising all other data communication.

8. The communication device of claim 1, the other data communication excluding voice communication.

9. The communication device of claim 1, the at least one application comprising an electronic mail application, and the application specific message comprising the payload comprising an electronic mail message.

10. The communication device of claim 1, the one or more processors further receive user input selectively enable one or more other applications; the other data communication excluding communication with the one or more other applications.

11. A method, comprising:
performing, with one or more processors of an electronic communication device:
enabling data messaging communication via a network and disabling other communication of data with the network;
receiving a data message via the network requesting data communication with an application operable on the one or more processors via the network;
temporarily enabling the data communication from the network with the application;
receiving one or more application specific data packets for the application; and
after the receiving the one or more application specific data packets for the application, disabling the other communication of data with the network.

12. The method of claim 11, further comprising, after the receiving the data message, transmitting an acknowledgement to receive the one or more application specific data packets for the application.

13. The method of claim 11, further comprising, prior to the receiving the one or more application specific data packets for the application, launching the application on the electronic communication device.

14. The method of claim 11, further comprising concealing the data message from a user interface of the electronic communication device.

15. The method of claim 11, further comprising, after the receiving the one or more application specific data packets for the application, terminating the application.

16. The method of claim 11, further comprising enabling communication of data with one or more applications in response to user input.

17. The method of claim 11, further comprising identifying application from the data message.

18. A system, comprising:
a server complex; and
one or more communication devices in communication with the server complex;
the server complex comprising one or more processors to:
receive an application specific message comprising a data payload intended for an application operating on one communication device;
transmit a data message to the one communication device, the data message indicating the application and providing a request to deliver the application specific message comprising the data payload to the application; and
after transmitting the data message, deliver the application specific message comprising the data payload to the application operating on the one communication device.

19. The system of claim 18, the one or more processors to cease communication with the one communication device until another message indicating the application or another application is sent to the one communication device.

20. The system of claim 18, the data message comprising a representational state transfer application programming interface.

* * * * *